Jan. 18, 1966     E. WEINBRENNER ETAL     3,230,047

APPARATUS FOR THE PRODUCTION OF POLYURETHANE PLASTICS

Original Filed May 6, 1957

INVENTORS:
ERWIN WEINBRENNER, PETER HOPPE, KARL BREER.

BY

*Clell W. Upchurch*

ATTORNEY

United States Patent Office 3,230,047
Patented Jan. 18, 1966

3,230,047
APPARATUS FOR THE PRODUCTION OF
POLYURETHANE PLASTICS
Erwin Weinbrenner, Opladen, Peter Hoppe, Troisdorf, and Karl Breer, Cologne-Flittard, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Continuation of application Ser. No. 657,318, May 6, 1957. This application Nov. 30, 1962, Ser. No. 243,969
Claims priority, application Germany, May 11, 1956, F 20,266
2 Claims. (Cl. 23—252)

The present application is a continuation of copending patent application Serial No. 657,318, filed May 6, 1957, and now abandoned.

This invention relates to a process for making porous and homogeneous polyurethane plastics and to an apparatus for carrying out this process.

In the manufacture of polyurethane plastics from organic compounds having at least two reactive hydrogen atoms and polyisocyanates, it is necessary to intimately mix the isocyanate and a catalyst with the more viscous polyester or other organic compound having the reactive hydrogen atoms before any substantial reaction has occurred. If a substantially uniform mixture of the more viscous material with the other components is not obtained almost instantaneously, the resulting product will lack the required degree of uniformity. Proper mixing of the components of the polyurethane plastic has presented a problem and many attempts have been made to provide a suitable mixing apparatus. Probably the most successful heretofore available mixing apparatus is disclosed in U.S. Patent 2,764,565, granted to Hoppe et al. This apparatus provides for the injection of the less viscous materials into the more viscous organic compound having the reactive hydrogen atoms and under most circumstances sufficient mixing is achieved.

Although, as indicated hereinbefore, the Hoppe et al. process and apparatus usually provides suitable mixing for making most polyurethane plastics, it has been found that in some instances even faster and more uniform mixing would be advantageous.

It is, therefore, a primary object of the present invention to provide an improved process for mixing the components of a polyurethane plastic. Another object is to provide a process for the production of porous and homogeneous polyurethane plastics wherein the components are mixed in such manner as to form a truly homogeneous reactive mixture. Another object of the present invention is to provide a process which results in the formation of polyurethane plastics having improved uniformity. A further object of the invention is to provide an apparatus suitable for carrying out the new improved process of making polyurethanes. Still further objects will become apparent from the following description with reference to the accompanying diagrammatical drawing in which FIGURE 1 is a vertical sectional view of an apparatus in accordance with this invention; and FIGURES 2 and 3 are sectional views of special arrangements which can be used in the apparatus of the present invention.

In accordance with this invention, generally speaking, the foregoing objects and others are accomplished by providing a process for mixing the components of a polyurethane plastic wherein the relatively viscous organic compound having reactive hydrogen atoms or a prepolymer prepared from such a compound is mixed with the other components in two separate and distinct injection steps. In the first injection step, the polyisocyanate or the cross-linking agent and/or accelerator is (are) injected into a stream of the organic compound having at least two reactive hydrogen atoms or of a prepolymer. In the second injection step, the remaining component(s), i.e., cross-linking agent and/or accelerator or polyisocyanate, if desired along with an additional amount of the organic compound having at least two reactive hydrogen atoms, is (are) injected into the mixture obtained in the first injection step. Stated somewhat differently, the present invention contemplates an apparatus and process in which two mixing zones are used and in which mixing is brought about by injection of one or more components into the other(s), the first of said mixing zones serving to mix the organic compound containing at least two reactive hydrogen atoms with part of the other reactants, and the second mixing zone serving to complete the formation of the reactive, polyurethane-forming mixture by adding the residual components to the mixture obtained in the first mixing zone. It has been found, in accordance with this invention, that the mixing of the polyurethane components by injecting the less viscous materials into the more viscous polyester or similar compound is further improved by injecting only some of the less viscous materials in one step and then injecting the other materials in a second step.

In both injection zones, the injection is effected by means of suitable injection means, such as injection nozzles, through which the components are introduced at a pressure substantially higher than that in said mixing zones. In general, the injection pressure will range from about 300 p.s.i. to about 15,000 p.s.i., but lower or higher injection pressures may be used, if desired.

Although the process of the invention is applicable to the production of porous and homogeneous polyurethane plastics, it is particularly useful in the manufacture of porous or cellular polyurethane plastics where components of widely different viscosities have to be brought together and intimate and efficient mixing is of critical importance.

In carrying out the process of the invention, the known formulations for making polyurethane plastics are employed. Thus, when making polyurethane foam, there are ordinarily used 0.6 to 10 mols of organic diisocyanate per one gram equivalent of reactive hydrogen contained in the organic compound having at least two reactive hydrogen atoms. Water, accelerator and emulsifier are employed in amounts of 0.5 to 5% by weight, 0.1 to 5% by weight and 0.5 to 10% by weight, respectively, based on the weight of the organic compound having at least two reactive hydrogen atoms. Whereas substantially linear compounds containing two reactive hydrogen atoms will react with diisocyanates to form elastic foams, rigid foams are obtained if a di- or tri-isocyanate is reacted with a branched compound having three or more reactive hydrogen atoms.

Representative examples of organic compounds having at least two reactive hydrogen atoms which are commonly used in the production of polyurethane plastics include polyesters of the alkyd type, polyalkylene ether glycols and hydrogenation products of olefine-carbon monoxide copolymers which all contain terminal hydroxyl groups and have molecular weights within the range of about 500 to 10,000. Among the commonly employed polyisocyanates are the phenylene diisocyanates, the toluylene diisocyanates, p,p'-diphenylmethane diisocyanate and the naphthylene diisocyanates. Cross-linking agents which are frequently utilized in the production of polyurethane plastics include water, glycols and diamines, while as examples of accelerators there may be mentioned tertiary amines and heavy metal compounds. In many cases, emulsifiers, such as high molecular alkyl sulfates or sulfonates, amine salts of high molecular fatty acids, and high molecular alkoxylation products of suitable hydroxyl compounds, are included in the formulation in order to facilitate mixing of the reactants.

The liquid reaction mixture obtained by the two-step injection procedure of the present invention forms the desired polyurethane plastic when allowed to stand or heated under the conditions known in the art.

A rather substantial volume of literature has developed in the last ten years or so in connection with the production of polyurethane plastics. Among the earliest publications are a book entitled, "German Plastics Practice," by De Bell et al. (1946), pages 316 and 463 to 465, and the articles by Otto Bayer in "Angew. Chemie," A 59, 257 (1947) and "Modern Plastics" 24, 149 (1947). However, in order to provide sufficient detail with respect to specific starting materials that are especially useful to make polyurethane foam and rubber and at the same time achieve a certain degree of brevity herein, reference is made to U.S. Patents 2,620,516, 2,621,166, 2,729,618, 2,778,810, and 2,764,565 and to German Patent 929,507, the disclosure of which is hereby incorporated herein by reference.

To carry out the process of the invention, an apparatus is employed which comprises in combination, a mixing chamber, means for introducing into said mixing chamber a continuous stream of the organic compound having at least two reactive hydrogen atoms or of a prepolymer, means located adjacent to said continuous stream for injection under pressure into the mixing chamber and into said stream measured amounts of the polyisocyanate or cross-linking agent and/or accelerator, a mixing head, pumping means to convey the mixture obtained in the mixing chamber to the mixing head, means for injection into the mixing head and into the mixture measured amounts of the cross-linking agent and/or accelerator or the polyisocyanate and discharging means for discharging the reactive, polyurethane-forming mixture obtained in the mixing head into a zone where conversion of the mixture into a polyurethane plastic takes place.

One embodiment of an apparatus for carrying out the process of the invention is shown diagrammatically in the drawing. Referring more particularly to the drawing, the apparatus illustrated in FIGURE 1 includes the container 7 for the organic compound containing at least two reactive hydrogen atoms, the container 1 for the second component, for example, the polyisocyanate or the cross-linking agent and/or accelerator and the container 11 for the remaining component(s), for example, the accelerator and/or cross-linking agent or the polyisocyanate.

The mixing chamber 4 is supplied continuously with the compound containing at least two reactive hydrogen atoms from the storage reservoir 7 which is under pressure, for example, air pressure of 2 atm. gauge. The introduction of measured quantities of the activator mixture (cross-linking agent and accelerator) into the stream of the compound containing at least two reactive hydrogen atoms is effected by an injection pump 2 into the nozzle space 3 of the mixing chamber 4, which is in addition provided with a pin-type stirrer 6 mechanically driven by a motor 5. The mixture of the compound containing at least two reactive hydrogen atoms and the activator is conveyed by the initial pressure acting on the reservoir 7 through the pipeline 8 to a gearwheel pump 9 and from the latter in measured quantities to the mixing head 10. In the mixing head 10, polyisocyanate delivered from the reservoir 11 by means of an injection pump 12 is introduced under pressure into the stream of the mixture. The pipe section between the pump 9 and mixing head 10, which can be of variable volume depending on the reaction velocity of the system, is under a pressure of, say 150 atm. gauge, whereas the mixing chamber 4 is only under the initial pressure of, for example, 2 atm. gauge which is acting on the reservoir 7. This obviates difficult sealing problems.

In order to avoid any dripping from the opening 16 of the mixing head 10 during intermittent foaming, two pressure valves 13 and 14, FIG. 2, are provided in the pipe system between delivery pump 9 and the nozzle mixing head 10, the valve 14 being set at a higher pressure than the valve 13, for example, the valve 14 may have an opening pressure of 30 atm. gauge and the valve 13 an opening pressure of 20 atm. gauge. In addition, the valve 14 is preferably designed as a relief valve in order to draw back any residues of the compound having reactive hydrogen and activator which may remain between the valve 14 and the outlet 16 from the mixing head after the apparatus has been stopped, thereby preventing any dripping. This arrangement of pressure valves is particularly necessary when a transportable mixing head is used and the pipe 15 is a high pressure hose. Due to the use of the pressure valves 13 and 14, the dilation of the hose, which is unavoidable when the apparatus is being moved, is maintained at the delivery pressure which rises up to 100 atm. gauge, depending on the viscosity of the polyester-activator mixture and on the differential setting chosen for the valves 13 and 14, even after the apparatus has stopped, so that when the apparatus is re-started, the mixture formed in mixing chamber 4 flows into the mixing head 10 at the same time as the polyisocyanate is delivered from the reservoir 11 by means of the pump 12. As a result, an accurately measured reaction mixture is immediately obtained in the first fractions of a second after starting the machine.

As a further control means for the reliable handling of the mixing device of the invention and for the sudden stopping of the apparatus when filling molds of a given capacity with foam, the control bar of the injection pump 12 (FIG. 1 and FIG. 3) comprising, for example, six cylinders is switched to a delivery capacity of zero by means of the lifting magnet 18, while the pump itself is allowed to continue running. If the introduction of, for example, the polyisocyanate into the mixing head 10, is effected by only one nozzle, all the cylinders of, for example, the six-cylinder pump operate on this one nozzle. When stopping the pump while maintaining the control bar delivery position for the necessary amounts of polyisocyanate, at least one piston will be at the working stroke so that a pressure is maintained in the supply pipe which is only slightly below the nozzle opening pressure (for example, a residual pressure of 130 atm. gauge as compared with the opening pressure of 150 atm. gauge). The result is frequently a leakage from the injection nozzle which leads to a gradual clogging of the mixing head (10), since the mixing chamber is filled with the mixture of compound containing reactive hydrogen and activator when the apparatus stops. If in accordance with FIG. 3 the control bar 17 of the injection pump 19 is adjusted by the solenoid 18 to zero on stopping the delivery of the mixture, while the pump is continuing to run, the pressure behind the nozzle falls in about $\frac{1}{20}$ second to the pressure maintained in the container 11 and the danger of clogging due to leakage is avoided.

The following examples illustrate the process of the invention in more detail.

*Example 1*

The reservoir 7 contains the following polyester mixture:

50 parts of a polyester consisting of
    5 mols of adipic acid,
    1 mol of phthalic anhydride,
    8 mols of hexanetriol,
30 parts of a polyester consisting of
    1.5 mols of adipic acid,
    1 mol of hexanetriol,
    1 mol of butanediol, 20 parts of ethoxylated trimethylol propane.
The activator mixture consisting of 3 parts of N-diethyl-β-phenoxyethylamine and 4 parts of the sodium salt of a sulfonated castor oil containing 54% of water, which is placed in the container 1, is injected into the above said polyester mixture in the mixing chamber 4. The mixture of polyester and activator is then passed into gearwheel pump 9 which leads the mixture into the injection space of the mixing head 10. In the reservoir 11 there is stored toluene diisocyanate which is injected into the mixture of polyester and activator by means of an injection pump 12 and the high-pressure nozzle positioned in the mixing head 10 in such a manner that 85 parts of toluenediisocyanate are applied per 100 parts of the mixture of polyester and activator. The final mixture leaves the mixing head 10 through the outlet 16.

*Example 2*

The reservoir 7 contains a polyester consisting of 15 mols of adipic acid,
16 mols of diethylene glycol,
1 mol of trimethylolpropane;

the container 1 contains an activator mixture consisting of 3 parts of bis-diethylaminoethanol-adipate,
0.5 parts of the sodium salt of a sulfonated castor oil containing 54% water,
1 part of water,
0.2 part of hexahydrodimethylaniline,
0.2 part of paraffin oil.

The reservoir 11 contains toluene diisocyanate. A mixture of polyester and activator 100 parts of polyester and 6 parts of activator is produced in the mixing chamber. 36 parts of toluene diisocyanate are injected into 100 parts each of the aforesaid mixture of polyester and activator in the mixing head 10.

*Example 3*

Reservoir 7 contains a flame retarding agent and polyester mixture of the following composition:

80 parts of a polyester consisting of
    5 mols of adipic acid,
    1 mol of phthalic anhydride,
    8 mols of hexanetriol;
20 parts of a polyester consisting of
    14 mols of adipic acid,
    15 mols of diethylene glycol;
30 parts of trichloroethyl phosphate.

Container 1 contains the following activator mixture:

2 parts of siliceous chalk,
4 parts of the sodium salt of a sulfonated castor oil containing 54% water,
3 parts of permethylated triethylenetetramine,
3 parts of N-diethyl-β-phenoxyethylamine,
85 parts of toluene diisocyanate, which are placed in the reservoir 11, are injected into 100 parts each of the mixture of polyester, activator and flame retarding agent in the mixing head 10.

*Example 4*

A mixture of polyester and activator is produced in the mixing chamber 4. 90 parts of a polyester consisting of 15 mols of adipic acid,
16 mols of diethylene glycol,
1 mol of trimethylol propane and
10 parts of a polyester consisting of
1 mol of adipic acid,
1 mol of ethylene glycol, are stored in reservoir 7 and the activator mixture consisting of 4 parts of bis-(diethylaminoethanol)-adipate,
1 part of a sodium salt of a sulfonated castor oil consisting of 54% water,
4 parts of water, is stored in container 1. 48 parts of toluene diisocyanate from the reservoir 11 are injected into 100 parts each of the mixture of polyester and activator in the mixing chamber 10.

*Example 5*

A mixture of polyester and activator consisting of 80 parts of a polyester consisting of
    2 mols of adipic acid,
    0.5 mol of phthalic anhydride,
    3.5 mols of trimethylolpropane,
    1 mol of 1,3-butanediol,
20 parts of a polyester consisting of
    15 mols of adipic acid
    16 mols of diethylene glycol
    1 mol of trimethylol propane and
0.7 part of the iron complex salt of cyclopentanonemonocarboxylicacidethylester, is produced in the mixing chamber 4. The polyester component is passed from the reservoir 7 and the activator component from container 1. 44 parts of toluene diisocyanate are injected from the reservoir 11 into 100 parts each of the aforesaid mixture.

The mixing device of the invention is suitable for the measured introduction of reaction mixtures into molds or hollow elements of all types. The capacity of the apparatus can be designed for a delivery speed of from 1 to 60 kg./min., depending on the size of the cavity to be filled. It is also possible to use the apparatus according to the invention to supply measured quantities of homogeneous materials comprising a polyurethane to casting or injection-molding process.

Furthermore, the improved apparatus according to the invention can be used for the production of homogeneous or porous plastics where an initial reaction product of a polyester or polyether and a polyisocyanate is combined with an activator system to produce the final reaction mixture. In this case, the polyester or polyether is initially mixed with the polyisocyanate in the mixing chamber 4 (see FIG. 1) and the mixing chamber 4 and the pipe 8 are heated, thus the pipe 8 may be a throughflow heater. The activator system is in this case supplied to the mixing head 10 from the reservoir 11 through the controlled-feed pump 12.

While certain representative embodiments and details have been show for the purpose of illustrating this invention, it will be apparent to those skilled in the art that various changes and modifications may be made therein without departing from the spirit and scope of the invention.

What is claimed is:

1. An apparatus for mixing the components of a polyurethane plastic which comprises a first mixing chamber having an agitator disposed therein, a discharge outlet and at least two inlets at least one of which is a means for injecting under pressure a first component into a second component, separate supply containers for each of said first and second components, a pumping means having a suction side and a discharge side, a first conduit connecting said discharge outlet of said first mixing chamber to said suction side of said pumping means, a second mixing chamber having a discharge outlet and a first and second inlet, at least one of which is an injection means for introducing a component under pressure, and a second conduit connecting the discharge side of said pumping means with said first inlet of said second mixing chamber, a second pumping means and a third conduit for connecting said second pumping means with said second inlet of said second mixing chamber.

2. An apparatus for mixing the components of a polyurethane plastic which comprises a first mixing chamber having a discharge outlet and at least two inlets at least one of which is a means for injecting under pressure a first component into a second component, a pumping means having a suction side and a discharge side, a first conduit connecting said discharge outlet of said first mixing chamber to said suction side of said pumping means, a second mixing chamber having a discharge outlet and a first and second inlet, at least one of which is an injection means for introducing a component under pressure, and a second conduit connecting the discharge side of said pumping means with said first inlet of said second mixing chamber, a first pressure sensitive valve and a second pressure sensitive valve disposed in said second conduit, said first pressure sensitive valve located in said second conduit between said first pumping means and said second pressure sensitive valve, said second pressure sensitive valve being operable at a pressure higher than said first pressure sensitive valve.

References Cited by the Examiner
UNITED STATES PATENTS 2,764,565　9/1956　Hoppe et al. _____ 23—252 X
2,779,689　1/1957　Reis.

MORRIS O. WOLK, *Primary Examiner.*
JAMES H. TAYMAN, Jr., *Examiner.*